United States Patent
Luo et al.

(10) Patent No.: US 10,469,824 B2
(45) Date of Patent: Nov. 5, 2019

(54) HYBRID DIGITAL-ANALOG CODING OF STEREO VIDEO

(71) Applicant: Microsoft Technology Licensing, LLC, Redmond, WA (US)

(72) Inventors: Chong Luo, Redmond, WA (US); Dongliang He, Redmond, WA (US); Wenjun Zeng, Beijing (CN)

(73) Assignee: Microsoft Technology Licensing, LLC, Redwood, WA (US)

( * ) Notice: Subject to any disclaimer, the term of this patent is extended or adjusted under 35 U.S.C. 154(b) by 0 days.

(21) Appl. No.: 15/761,751

(22) PCT Filed: Oct. 24, 2016

(86) PCT No.: PCT/US2016/058399
§ 371 (c)(1),
(2) Date: Mar. 20, 2018

(87) PCT Pub. No.: WO2017/074845
PCT Pub. Date: May 4, 2017

(65) Prior Publication Data
US 2018/0270471 A1    Sep. 20, 2018

(30) Foreign Application Priority Data
Oct. 30, 2015 (CN) .......................... 2015 1 0726361

(51) Int. Cl.
*H04N 13/161* (2018.01)
*H04N 19/129* (2014.01)
(Continued)

(52) U.S. Cl.
CPC ......... *H04N 13/161* (2018.05); *H04N 13/178* (2018.05); *H04N 19/129* (2014.11);
(Continued)

(58) Field of Classification Search
CPC .... H04N 7/0117; H04N 7/013; H04N 13/161; H04N 13/178; H04N 19/103;
(Continued)

(56) References Cited

U.S. PATENT DOCUMENTS 5,270,816 A    12/1993   Citta et al.
5,510,840 A *   4/1996   Yonemitsu ............... H04N 7/54
                                                    375/240.15
(Continued)

FOREIGN PATENT DOCUMENTS

CN        1109247 A     9/1995
CN      102088599 A     6/2011
(Continued)

OTHER PUBLICATIONS

"Office Action Issued in Chinese Patent Application No. 201510726361.9", dated Sep. 30, 2018, 11 Pages.
(Continued)

*Primary Examiner* — Young T Tse
(74) *Attorney, Agent, or Firm* — Schwegman Lundberg & Woessner, P.A.

(57) ABSTRACT

In this disclosure, a hybrid digital-analog video coding scheme is described. For a video including at least two associated sequences of frames such as a stereo video, some of the frames are digitally encoded, while the others are encoded in an analog way with reference to the digital frames. For an analog frame, a previous frame in the same sequence/view and a temporally consistent frame in another sequence/view will be encoded as digital frames. These two digital frames are used to provide side information in encoding the analog frame. At decoding side, inverse operations are performed. Such "zigzag" hybrid coding significantly improves the coding efficiency while providing robustness and good visual quality.

15 Claims, 6 Drawing Sheets

(51) Int. Cl.
*H04N 19/503* (2014.01)
*H04N 19/597* (2014.01)
*H04N 13/178* (2018.01)
*H04N 19/46* (2014.01)
*H04N 19/65* (2014.01)

(52) U.S. Cl.
CPC .......... *H04N 19/46* (2014.11); *H04N 19/503* (2014.11); *H04N 19/597* (2014.11); *H04N 19/65* (2014.11)

(58) Field of Classification Search
CPC .. H04N 19/105; H04N 19/107; H04N 19/109; H04N 19/129; H04N 19/137; H04N 19/169; H04N 19/172; H04N 19/184; H04N 19/1887; H04N 19/20; H04N 19/44; H04N 19/46; H04N 19/463; H04N 19/48; H04N 19/503; H04N 19/517; H04N 19/597; H04N 19/65
USPC ...... 375/240, 240.1, 240.11, 240.13, 240.23, 375/240.24, 240.27, 253, 261, 279, 281, 375/295, 298, 308, 316, 329, 332; 348/384.1, 394.1, 395.1, 398.1, 400.1, 348/401.1, 415.1, 420.1, 421.1, 430.1
See application file for complete search history.

(56) References Cited

U.S. PATENT DOCUMENTS

| | | | | |
|---|---|---|---|---|
| 7,130,473 | B2* | 10/2006 | Wu | H04N 19/105 382/238 |
| 2002/0021752 | A1* | 2/2002 | Hannuksela | H04N 19/89 375/240.01 |
| 2008/0205529 | A1 | 8/2008 | Hannuksela et al. | |
| 2011/0176616 | A1 | 7/2011 | Luthra et al. | |
| 2012/0140814 | A1* | 6/2012 | Sole Rojals | H03M 7/4018 375/240.02 |
| 2012/0163471 | A1* | 6/2012 | Karczewicz | H04N 19/159 375/240.23 |
| 2014/0376613 | A1* | 12/2014 | Sekiguchi | H04N 9/7921 375/240.02 |
| 2015/0172661 | A1* | 6/2015 | Dong | H04N 19/51 375/240.03 |

FOREIGN PATENT DOCUMENTS

| | | |
|---|---|---|
| WO | 2007081838 A1 | 7/2007 |
| WO | 2008147162 A1 | 12/2008 |
| WO | 2013024490 A3 | 2/2013 |
| WO | 2014098789 A1 | 6/2014 |
| WO | 2015155406 A1 | 10/2015 |

OTHER PUBLICATIONS

"International Preliminary Report on Patentability Issued in PCT Application No. PCT/US2016/058399", dated May 11, 2018, 16 Pages.

"International Search Report and Written Opinion Issued in PCT Application No. PCT/US2016/058399", dated Jul. 25, 2017, 23 Pages.

Tien, et al., "Transform-domain Partial Prediction Algorithm for Intra Prediction in H.264/AVC", In the International Symposium on IEEE on Circuits and Systems, Jun. 26, 2009, 1245-1248.

Yu, et al., "Wireless Scalable Video Coding Using a Hybrid Digital-Analog.", In Proceedings of IEEE Transactions on Circuits and Systems for Video Technology, vol. 24, Jul. 17, 2013, 331-345.

"Second Office Action Issued in Chinese Patent Application No. 201510726361.9", dated Jul. 3, 2019, 10 Pages.

* cited by examiner

HYBRID DIGITAL-ANALOG CODING OF STEREO VIDEO

PRIORITY CLAIM

This application is a 35 U.S.C. § 371 National Stage Application of International Application No. PCT/US2016/058399, filed Oct. 24, 2016 and published as WO 2017/074845 A2 on May 4, 2017, which claims priority to Chinese Application No. 201510726361.9, filed on Oct. 30, 2015, which applications and publication are incorporated herein by reference in their entireties.

BACKGROUND

Stereo or three-dimensional (3D) video has attracted increasing interests in recent years. There is a trend that a large portion of the stereo videos will be captured and consumed by portable multifunction devices such as mobile devices. For example, several virtual reality (VR) head-mounted displays (HMDs), together with the maturing civilian unmanned aerial vehicles (UAVs) and robots, are capable of providing very exciting immersive first person view (FPV) experiences, either for personal enjoyment or for visual inspection of otherwise inaccessible terrain features. In these fascinating applications, the low-delay transmission of stereo videos over varying wireless channel presents a huge challenge.

As known, a stereo image/video is composed of frames from two views. The data volume is almost doubled in comparison with the traditional two-dimensional (2D) image/video. As a result, the coding efficiency is of vital importance to stereo video transmission under the constraint of limited bandwidth. Meanwhile, wireless channel is time-varying and the rate of variation is dependent on the velocity of the device that captures the stereo video. For example, for the capturing device is in high mobility, it is preferred to choose a robust modulation scheme and a strong channel code in order to ensure reliable video delivery. This reduces the effective bandwidth and exacerbates the discrepancy between source and transmission rates. As a result, the video quality is sacrificed and the user experience is dramatically degraded.

SUMMARY

In accordance with implementations of the subject matter described herein, a hybrid digital-analog video coding scheme is proposed. For a video at least including two associated views or sequences of frames such as a stereo video, some of the frames are digitally encoded while the others are encoded in an analog way with reference to the digital frames. For an analog frame, a previous frame in the same sequence/view and a temporally consistent frame in another sequence/view are both encoded as digital frames. These two digital frames are used to provide side information in the analog coding. At decoding side, inverse operations are performed. The proposed hybrid "zigzag" coding improves the coding efficiency and provides high robustness and visual quality.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols are used to indicate the same or similar elements.

DETAILED DESCRIPTION

The subject matter described herein will now be discussed with reference to several example implementations. It should be understood these implementations are discussed only for enabling those skilled persons in the art to better understand and thus implement the subject matter described herein, rather than suggesting any limitations on the scope of the subject matter.

As used herein, the term "includes" and its variants are to be read as opened terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," "third" and the like may refer to different or same objects. Other definitions, explicit and implicit, can be included below.

Figure 1:
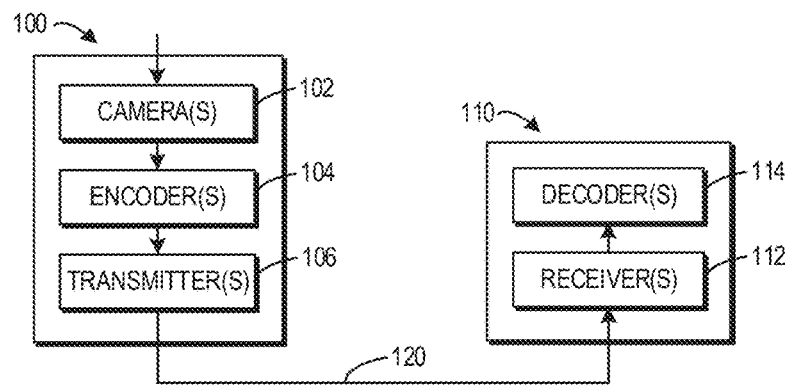
FIG. 1 is a block diagram of an environment where implementations of the subject matter described herein can be implemented.

FIG. 1 illustrates a block diagram of an environment where implementations of the subject matter described herein can be implemented. As shown, the environment includes a sending device 100 and a receiving device 110. The sending device 100 includes one or more cameras 102 for capturing videos/images of a scene. Specifically, camera(s) 102 is able to capture stereo videos including multiple sequences of frames corresponding to different views.

Figure 2:
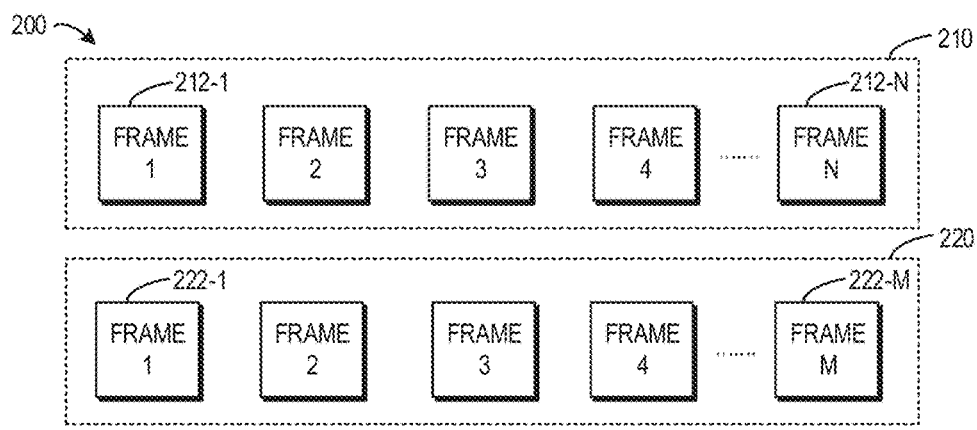
FIG. 2 is a schematic diagram of a video comprising multiple sequences/view of frames to which one implementation of the subject matter described herein can be applied.

FIG. 2 shows an example stereo video captured by the camera 102. In this example, the video 200 contains sequences 210 and 220 that are associated with one another. For example, the sequences 210 and 220 may correspond to the right-eye and left-eye views of the scene. For ease of illustration, the terms "sequence" and "view" can be used interchangeably. The sequence 210 includes multiple frames 212-2 . . . 212-N and the sequence 220 includes multiple frames 222-1 . . . 222-M, where N and M are natural numbers and usually N=M. The corresponding frames in different sequences may be temporally consistent with each other. For example, the frames 212-1 and 222-1 may be captured at the same time and thus have temporal consistency. It is to be understood that in other implementations, the stereo video may contain more than two sequences.

Still in reference to FIG. 1, the stereo video captured by the camera(s) 102 is fed into one or more encoders 104 which encode or compress the stereo video. The encoder 104 performs hybrid digital-analog coding by encoding some frames as digital frames and the other frames as analog frames. By selecting the digital and analog frames in a "zigzag" fashion, each analog frame may have two digital frames from the same and different sequences, respectively, as reference frames. Example implementations of the encoder(s) 104 will be described in the following paragraphs.

The encoded stereo video may be transmitted by one or more transmitters 106 to the receiving device 110 via a wireless and/or wired communication channel 120. The device 110 includes one or more receivers 112 which receives and provides the received signals to one or more decoders 114. In general, the decoder(s) 114 performs operations inverse to those by the encoders 104 to reconstruct the digital and analog frames of the stereo video. Example implementations of the decoder(s) 114 will also be described in the following paragraphs.

Figure 3:
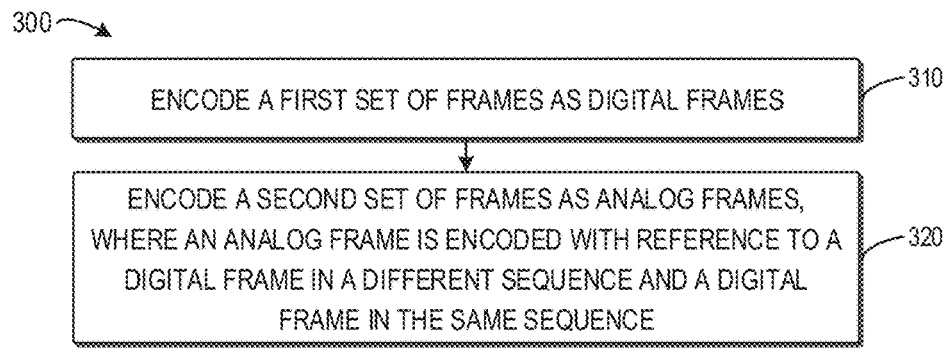
FIG. 3 is a flowchart of a method for encoding a stereo video in accordance with one implementation of the subject matter described herein.

Now some example implementations of the video encoding will be described. FIG. 3 shows a flowchart of a method 300 for encoding a stereo video in accordance with implementations of the present disclosure. The method 300 can be implemented by the encoder(s) 104 as shown in FIG. 1, for example. As described above, the stereo video includes a plurality of sequences of frames that are associated with each other.

In step 310, the encoder(s) 104 encodes or compresses a first set of the frames of the video as digital frames. In step 320, a second set of the frames of the video is encoded as analog frames. In some implementations, the second set of frames may include all the remaining frames other than the digitally encoded frames. In accordance with implementations of the subject matter described herein, the analog frames are encoded with reference to at least two digital frames, namely, a digital frame from the same sequence/view and a digital frame from a different sequence/view. By means of zigzag selection of the digital and analog frames, which will be detailed below, high coding efficiency and good perceptual quality can be achieved.

Figure 4:
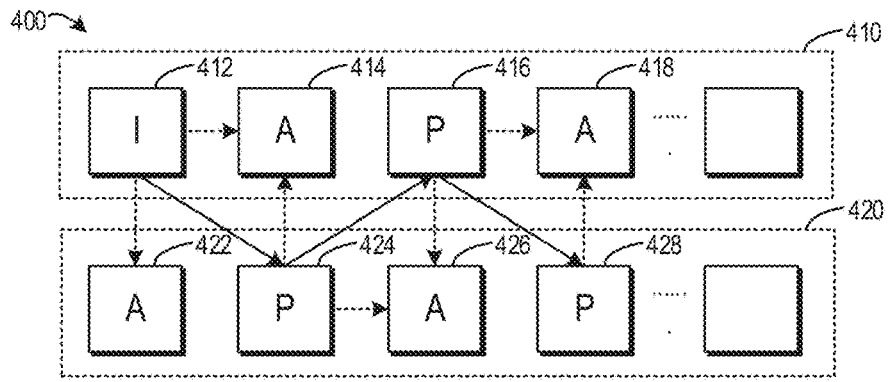
FIG. 4 is a schematic diagram of the zigzag coding schematic in accordance with one implementation of the subject matter described herein.

FIG. 4 shows a schematic diagram of the zigzag coding scheme in accordance with one implementation of the subject matter described herein. In this example, the frames marked with the letter "A" are selected as analog frames which will be encoded or compressed by an analog method. The frames marked with the letter "I" or "P" are selected as digital frames which will be digitally encoded or compressed. More particularly, the frame marked with "I" is an intra-frame ("I-frame") which contains all necessary information within itself, while the frames marked with "P" are predicted frames ("P-frames") which contain only information on the differences from reference frames.

As shown in FIG. 4, the digital and analog frames are alternately selected within the sequences 410 and 420 of a piece of stereo video 400. Particularly, for the sequence 410, the frames 412 and 416 are encoded as digital frames, while the frames 414 and 418 are encoded as analog frames. For the sequence 420, the frames 424 and 428 are encoded as digital frames, while the frames 422 and 426 are encoded as analog frames. As a result, the digital frames 412, 424, 416, and 428 are selected in a zigzag fashion across the sequences 410 and 420, as indicated by the solid arrows. Likewise, the analog frames 422, 414, 426, and 418 are selected in the zigzag fashion as well. By selecting the digital and analog frames in this way, for each analog frame, there are two digital frames that can be used as reference frames in analog coding. One reference frame is the previous digital frame coming from the same sequence. The other reference frame is the digital frame which comes from a different sequence and which has temporal consistency with the analog frame.

As an example, in encoding the analog frame 414 in the sequence 410, the digital frame 412 from the same sequence 410 and the digital frame 424 from the different sequence 420 will be used as reference frames, as shown by the dashed arrows in FIG. 4. The reference digital frame 412 is prior to the analog frame 414, and the reference digital frame 424 has temporal consistency with the analog frame 414. For example, in those implementations where the sequences 410 and 420 correspond to left-eye and right-eye views, respectively, the digital frame 424 and the analog frame 414 may be captured by the camera(s) 102 at substantially the same time.

In other words, in accordance with implementations of the subject matter described herein, each digital frame serves as a reference frame for a subsequent analog frame from the same sequence and a temporally consistent analog frame from a different sequence. For example, in FIG. 4, the digital I-frame 412 can be used as a reference frame in encoding the analog frame 414 in the same sequence 410 and the analog frame 422 in the different sequence 420, as shown by the dashed arrows. As another example, the digital P-frame 424 in the sequence 420 is a reference frame for the analog frame 426 in the same sequence 420 and the analog frame 414 in the different sequence 410.

It is to be understood that although the analog frames are shown to be immediately after their respective reference digital frames in the same sequences, this is merely an example without suggesting any limitations as to the scope of the subject matter described herein. In other implementations, the encoding of an analog frame can make a reference to any previous digital frame. For example, in one implementation, in addition to or instead of the digital frame 414, the analog frame 418 may be encoded with reference to the previous digital frame 412. That is, an analog frame may have more than two reference digital frames.

Particularly, as to the analog frame that is a leading frame in a sequence, only one digital frame from a different sequence is available in the analog encoding. For instance, in the example shown in FIG. 4, the analog frame 422 in the sequence 420 has a single reference frame 412 in the sequence 410 In the context of this disclosure, it can be considered that the digital reference frame for a leading analog frame from the same sequence is a NULL frame.

The proposed zigzag coding scheme would be beneficial to both robustness and efficiency of the coding. In particular, in view of the binocular suppression theory, the perceived stereo video quality is closer to the higher fidelity view, as long as the other view remains above a threshold. In accordance with implementations of the subject matter described herein, for each pair of frames from different views, one frame is digitally encoded and the other is an analog one. As will be described below, the digital frame may be encoded with a relatively low basic quality, and the quality of the analog frame can be adapted to the channel condition. When the channel is moderately good, the analog frame will be received at a high quality and will dominate the visual quality. Unlike the conventional digital method which encodes the frames into a given quality and runs the risk of receiving a corrupted bit stream in bad channels, the visual quality may be adaptively changed depending on the channel condition.

Some example implementations of the digital and analog coding in steps 310 and 320 will now be described. In step 310, although the digital frames are alternately drawn from different sequences of frames, they can be treated as a single video sequence. Any digital encoding/compression approaches, either currently known or to be developed in the future, can be used to encode the digital frames. For example, in some implementations, the digital frames may be encoded by an encoding method conforming to the H.264 standard with low-delay profile.

In addition, the binocular suppression theory suggests that compressing one frame of the stereoscopic frame pair to a basic quality which is no lower than a certain threshold will not degrade the stereo visual quality, as described above. Therefore, in some implementations, the encoder(s) 104 may compress the digital frames to a basic quality which is associated with a relatively low peak signal-to-noise ratio (PSNR). Of course, in order to avoid the perceptual degradation of the visual quality, the PSNR cannot be too low. Experiments show that the lower threshold PSNR may be set as 31 dB or 33 dB, depending on the type of displays. Accordingly, in one implementation, the PSNR for digital frame may be approximately 34 dB, for example.

In step 320, those frames other than the digital frames are encoded by an analog method, where each analog frame has at least two digital frames as reference frames, as described above. In the context of this disclosure, the information provided by the reference digital frames that can be used in the analog encoding is referred to as "side information (SI)." In encoding an analog frame, the previous digital frame in the same sequence may provide "intra-sequence/view" side information, and the temporally consistent digital frame in another sequence provides "inter-sequence/view" side information. The side information may be used in various ways, depending the requirements or configurations of the encoder(s) 104. For example, in some implementations, the side information may be directly subtracted from the analog frame for simplicity.

In some implementations, in encoding an analog frame, both the inter-sequence and intra-sequence side information are taken into consideration. For example, in one implementation, each analog frame may be first spatially de-correlated, which can be done by applying a transformation on the analog frame. Example transformation includes, but is not limited to, Discrete Cosine Transformation (DCT). The de-correlation produces a set of transformation coefficients denoted as $X_a$. Then the analog signal to be transmitted as the encoded analog frame can be obtained as follows:

$$X = X_a - X_{SI}^{(Inter)} - X_{SI}^{(Intra)} \quad (1)$$

where $X_{SI}^{(Inter)}$ and $X_{SI}^{(Intra)}$ represent the inter-sequence and intra-sequence side information, respectively. The side information may be obtained by applying the transformation on the respective digital frames.

In the above implementations, the analog encoding is directly performed on the level of frames. Alternatively, in other implementations, the granularity may be decreased in order to obtain more refined coding. For example, in some implementations, the transformation coefficients may be divided into chunks such as rectangular chunks of the same size. The chunks are denoted as $X_{a,i}$, i=1, 2, . . . N, where N represents the number of chunks. In one implementation, the analog signal for each chunk can be determined as follows:

$$X_i = X_{a,i} - X_{SI,i}^{(Inter)} - X_{SI,i}^{(Intra)} \quad (2)$$

where $X_{SI,i}^{(Inter)}$ represents the inter-sequence side information provided by the corresponding chunk in the reference digital frame from the different sequence, and $X_{SI,i}^{(Intra)}$ represents the intra-sequence side information provided by the corresponding chunk in the reference digital frame from the same sequence. $X_{SI,i}^{(Inter)}$ and $X_{SI,i}^{(Intra)}$ can be collectively referred to as "chunk side information."

It can be seen that in the above example implementations, the side information from both reference digital frames is used. However, this might not always achieve optimal coding result. Considering two correlated zero-mean random variables A and B, it is known that $$\mathrm{var}\{A-B\} = \mathrm{var}\{A\} + \mathrm{var}\{B\} - 2\mathrm{cov}\{A,B\} \quad (3)$$

where var{*} represents the variance of a variable and cov{*} represents the convolution of variables. In case that 2cov{A,B}<var{B}, the resulting var{A–B} will be even larger than var{A} if variable B is taken as a reference. To deal with this situation, in some implementations, the side information may be adaptively selected in analog coding. That is, in such implementations, the analog coding can be done by using the side information from only one of the reference digital frames or even without use of the side information.

Considering the chunk-level analog coding as an example, the encoded analog signals for the chunks may be expressed as follows:

$$X_i = X_{a,i} - I(i) \times X_{SI,i}^{(Inter)} - J(i) \times X_{SI,i}^{(Intra)} \quad (4)$$

where I(i) and J(i) represent the masks for the inter-sequence and intra-sequence side information, respectively. The analog signals $X_i$ may be modeled as zero mean Gaussian sources, for example. Without loss of generality, their variances (denoted as $\lambda_i$) are assumed to meet the condition $\lambda_p \geq \lambda_q$, $\forall p \leq q$.

The masks I(i) and J(i) may be obtained in a variety of ways. For example, in one implementation, for each chunk $X_{a,i}$, the variance of the chunk itself may be determined:

$$\lambda_{a,i} = \mathrm{var}\{X_{a,i}\} \quad (5)$$

In addition, a first variance of the difference between the chunk $X_{a,i}$ and the corresponding chunk in the reference digital frame from the different sequence may be determined:

$$\lambda_{R,i}^{(1)} = \mathrm{var}\{X_{a,i} - X_{SI,i}^{(Inter)}\} \quad (6)$$

A second variance of the difference between the chunk $X_{a,i}$ and the corresponding chunk in the reference digital frame from the same sequence may be determined:

$$\lambda_{R,i}^{(2)} = \mathrm{var}\{X_{a,i} - X_{SI,i}^{(Intra)}\} \quad (7)$$

Then the masks I(i) and J(i) may be determined based on the variance of the chunk, the first variance and the second variance, as follows:

$$\begin{cases} I(i) = 0, J(i) = 0, & \text{if } \lambda_{a,i} \leq \min\{\lambda_{R,i}^{(1)}, \lambda_{R,i}^{(2)}\} \\ I(i) = 1, J(i) = 0 & \text{if } \lambda_{R,i}^{(1)} \leq \min\{\lambda_{a,i}, \lambda_{R,i}^{(2)}\} \\ I(i) = 0, J(i) = 1 & \text{otherwise} \end{cases} \quad (8)$$

That is, in this implementation, if the variation of the chunk itself is less than both the first and second variances, then no side information is used in the analog encoding of this chunk. If the first variation is the minimal one, then only the inter-sequence chunk side information is used. Otherwise, if the second variation is the minimal one, only the intra-sequence chunk side information is used.

It is to be understood that the above implementations are described merely for illustration, without suggesting any limitations as to the scope of the subject matter described herein. For example, instead of the chunk side information, the selection mechanism as described above can be used to select the side information on the basis of entire frames.

Figure 5:
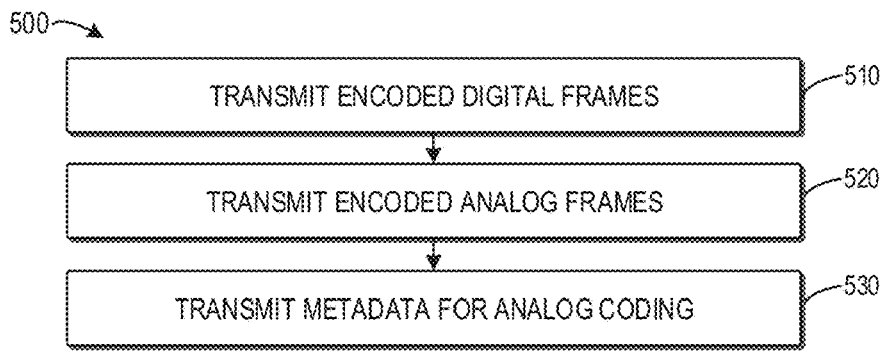
FIG. 5 is a flowchart of a method for transmitting an encoded stereo video in accordance with one implementation of the subject matter described herein.

By applying the method 300, the frames in the stereo video are encoded in a hybrid digital-analog fashion. Then the encoded digital and analog frames may be transmitted by the transmitter(s) 106 via the channel 120. FIG. 5 shows a method 500 for transmitting the encoded stereo video in accordance the implementations of the subject matter described herein. The method 500 may be implemented by the transmitter(s) 106 as shown in FIG. 1, for example, and can be carried out after the method 300.

In step 510, the encoded digital frames are transmitted. For example, in some implementations, the digital signals may be transmitted following the digital communication framework as specified, for example, by IEEE 802.11a standard in order to be compliant with existing transmission schemes.

Specifically, the digital frames may be encoded with basic quality and will provide side information in the analog decoding at the receiver side, as described above. In order to ensure high decoding performance, strong protection may be provided to the digital bit stream representing the encoded digital frames. To this end, in some implementations, a robust forward error correction (FEC) code may be added to the digital bit stream for protection. For instance, the digital bit stream may be scrambled and convolutional coded, for example, by rate 1/2 convolutional code. Then the bit interleaving may be applied to resist burst bit errors.

The transmitter(s) 106 may apply baseband quadrature amplitude modulation (QAM) and transmit the modulated digital signals in orthogonal frequency division multiplexing (OFDM) symbols. In some implementations, phase shift keying modulation technology may be adopted. For example, it is possible to use Binary Phase Shift Keying (BPSK) which is known to be one of the most robust modulation schemes. However, it is known that BPSK leaves the Q-axis of the constellation plane unused, which may decrease the bandwidth efficiency. As an alternative, in other implementations, the transmitter(s) 106 may utilize Quadrature Phase Shift Keying (QPSK) with double symbol energy. It has been found that QPSK can achieve exactly the same bit error rate (BER) performance as BPSK when per symbol energy is doubled.

In step 520, the encoded analog frames are transmitted. Considering the chunk-based analog coding as an example, the analog signals $X_i$'s are to be transmitted on the channel 120. In some implementations, the analog coefficients may be directly transmitted after power scaling. In one implementation, skipping channel coding and modulation, each pair of coefficients may be combined into a symbol such as a complex (I, Q) symbol and transmitted through raw OFDM channel, for example.

It is to be understood that although the encoded digital frames are shown to be transmitted before the analog frames, this is merely for the purpose of illustration without suggesting any limitations as to the scope of the subject matter described herein. The digital and analog signals may be transmitted in any suitable order or in parallel, depending on the configuration of the transmitter 106 and/or the receiver 112, for example.

In transmitting the encoded digital and analog signals in steps 510 and 520, the transmitter(s) 106 may control the allocation of the transmission power and bandwidth among the digital transmission and analog transmission. It is supposed that the total bandwidth can offer time slots corresponding to M chunks. Upon completion of the digital coding, the transmitter(s) 106 may determine the number of time slots to be consumed by the digital transmission, which is supposed to be equivalent to the bandwidth needed for transmitting $N_d$ chunks. In this case, only $N_a = M - N_d$ chunks of coefficients of the analog frames can be transmitted.

In order to achieve better transmission performance, the transmitter(s) 106 may allocate the total transmission power based on the bandwidth allocation. For example, the transmitter(s) 106 may first determine the average symbol power, denoted as $p_d$, for transmitting the encoded digital frames. By way of example, for QPSK symbols, the average symbol power $p_d$ may be set to meet the following condition:

$$\frac{p_d}{\sigma^2} \geq \gamma \quad (9)$$

where $\gamma$ represents a signal-to-noise (SNR) threshold and $\sigma^2$ represents the average power of the constellation noise symbols. By transmitting the digital signals with the average symbol power $p_d$ determined in this way, the probability of error-free transmission will be quite high.

In practice, the average symbol power $p_d$ for digital transmission may be determined in the following way. First, the average constellation symbol power, denoted as $p_t$, may be determined based on the total transmission power $P_t$ and total bandwidth M. For example, in those implementations where each (I, Q) symbol conveys two analog coefficients, the average constellation symbol power $p_t$ can be computed as follows:

$$p_t = 2P_t/M \quad (10)$$

Then the average channel noise power, denoted as $\sigma_m^2$, may be determined based on determined average constellation symbol power $p_t$ and a target SNR at the transmitter(s) 106, denoted as $\gamma_t$, using the following equation:

$$10 \times \log_{10} \frac{p_t}{\sigma_m^2} = \gamma_t \quad (11)$$

Next, the average symbol power $p_d$ for digital transmission may be determined based on the average channel noise power $\sigma_m^2$ and the threshold SNR $\gamma$ using the following equation:

$$10 \times \log_{10} \frac{p_d}{\sigma_m^2} = \gamma \quad (12)$$

The SNR threshold $\gamma$ may be determined based on specific implementations. By way of example, for QPSK ½ FEC 802.11a PHY, it has been verified that $\gamma=8$ dB is sufficient to support faithful reception. In order to get rid of channel state information feedback from the receiving device 110, in some implementations, the transmitter(s) 106 may enforce a relatively low target SNR, for example, $\gamma_t=4$ dB. In this way, it is possible to support a large SNR range and can be readily used for multicast.

Given the average symbol power $p_d$ for digital transmission, the power $P_d$ allocated to the digital transmission may be computed as follows:

$$P_d = p_d \times \frac{N_d}{2} \quad (13)$$

Then the power $P_a$ used for analog transmission is:

$$P_a = P_t - P_d = P_t - p_d \times \frac{N_d}{2} \quad (14)$$

In this way, the transmission power is effectively allocated to the digital transmission and analog transmission.

When transmitting the N chunks $X_i$ using $N_a$ chunks' bandwidth and total power $P_a$ over additive white Gaussian noise (AWGN) channels, the chunks with the smallest variances should be dropped and the first $N_a$ chunks are transmitted after power scaling by a factor $g_i$:

$$g_i = \lambda_i^{-\frac{1}{4}} \sqrt{\frac{P_a}{\sum_{j=1}^{N_a} \sqrt{\lambda_j}}}, \, i = 1, 2, \ldots, N \quad (15)$$

Accordingly, the received signals can be represented as:

$$Y = GX + V \quad (16)$$

where $G = \text{diag}(g1, g2, \ldots, g_{N_a})$, $X = [X_1, X_2, \ldots, X_{N_a}]^T$, and $V \in \mathbb{R}^{N_a \times 1}$ represents the additive Gaussian noise with the power of $\sigma^2/2$. The discarded chunks are replaced by their mean value which is zero at the receiver(s) 112. Let $\hat{X}_i$ denotes the reconstructed version of $X_i$, the distortion can be determined as follows:

$$D = \sum_{i=1}^{N} E\{(\hat{X}_i - X_i)^2\} \quad (17)$$

$$= \sum_{i=1}^{N_a} E\{(\hat{X}_i - X_i)^2\} + \sum_{i=1+N_a}^{N} E\{X_i^2\}$$

$$= \sum_{i=1}^{N_a} \frac{\sigma^2/2}{g_i^2} + \sum_{i=N_a+1}^{N} \lambda_i$$

$$= \frac{\sigma^2/2}{P_a} \left( \sum_{i=1}^{N_a} \sqrt{\lambda_i} \right)^2 + \sum_{i=N_a+1}^{N} \lambda_i$$

It can be seen from Equation (17) that a smaller $\lambda_i$ may obtain less distortion. This is a theoretical support to the zigzag selection of digital and analog frames as discussed with reference to FIG. 4.

Still in reference to FIG. 5, in step 530, the metadata for the analog coding is transmitted to the receiving device 110. The metadata at least indicates the usage of the side information used in encoding each analog frame. For example, in one implementation, the masks I(i) and J(i) associated with each analog frame or the chunks thereof may be sent as a part of the metadata. The decoder(s) 114 may use the metadata to reconstruct the analog frames, which will be discussed in the following paragraphs. In addition, or alternatively, in those implementations where the analog encoding is done based on chunks, the metadata may include the position and variation ($\lambda_i$) of each chunk.

Figure 6:
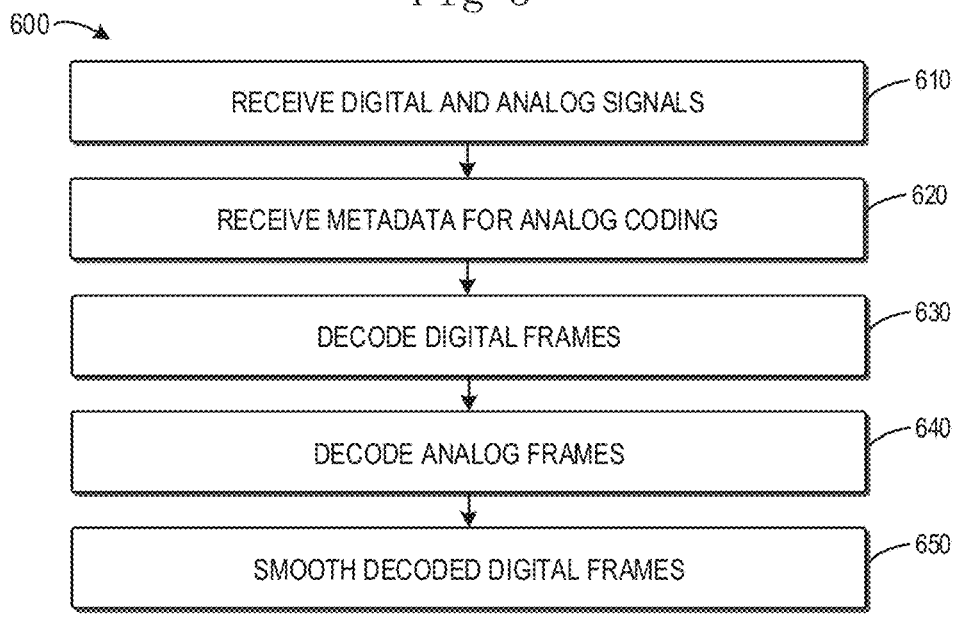
FIG. 6 is a flowchart of a method for decoding a stereo video in accordance with one implementation of the subject matter described herein.

In addition, it would be appreciated that in some situations, the above assumption that the first $N_a$ chunks are the ones with the largest variances does not hold. Thus in some implementations, an indication of the $N_a$ chunks with the largest variances is also delivered to the receiving device 110 as a part of the metadata. In one implementation, the metadata may be entropy encoded for transmission, for example FIG. 6 shows a method 600 for decoding an encoded stereo video in accordance with implementations of the subject matter described herein. The method 600 may be implemented by the receiver(s) 112 and decoder(s) 114 of the device 110, for example. In general, the decoding process includes operations inverse to those involved in the encoding process. That is, the digital frames may be decoded and then used as side information to decode the analog frames.

As shown, in step 610, the receiver(s) 112 of the device 110 receives signals representing a stereo video which is encoded, for example, by the method 300. As described above, some frames of the stereo video are encoded as digital frames and the others are encoded as analog frames, where each analog frame is encoded with reference to a digital frame in the same sequence and a digital frame in a different sequence. The signals received in step 610 include digital signals carried in digital symbols and analog signals (such as the analog coefficients) carried in analog symbols.

In step 620, the receiver(s) 112 further receives the metadata for analog coding. As discussed above, the metadata at least indicates the side information which is provided by the digital frames and which is used in encoding analog frames or the chunks thereof. For example, the metadata may include the masks for the inter-sequence and intra-sequence side information I(i) and J(i) as discussed above.

In step 630, the digital frames are decoded from the received digital signals. Digital decoding technology is known and will not be detailed herein. In step 640, the analog frames are decoded from the received analog signals based on the decoded digital frames. For example, the transmitted analog signals may be constructed from the analog symbols. Then, based on the metadata received in step 620, the decoder(s) 114 retrieves the respective side information from the decoded digital frames. The side information is used to obtain the transformation coefficients such DCT coefficients, which can be used to reconstruct the analog frames.

From the above descriptions, it would be appreciated that each sequence/view of the decoded video includes interlaced lower quality digital frames and higher quality analog frames. If a single view is presented, users will experience the twinkling effect. However, when both views are presented, the high quality view (for example, when switching between left and right views) will dominate the visual experience and the twinkling effect is mitigated. In order to further improve the rendering effect, in some implementations, in step 650, the decoder(s) 114 may perform quality enhancement by smoothing the decoded digital frames.

Figure 7:
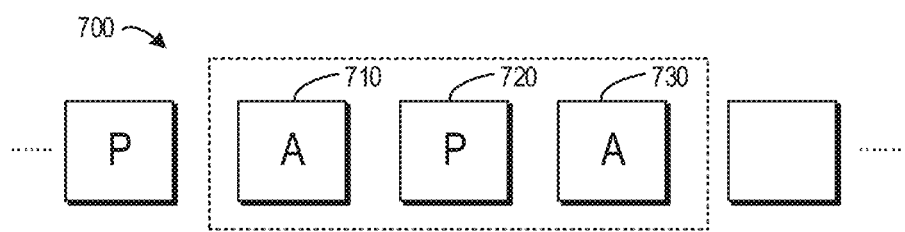
FIG. 7 is a schematic diagram of smoothing of a decoded digital frame in accordance with one implementation of the subject matter described herein.

For each digital frame of the basic quality, its previous and subsequent frames in the same sequence as well as the frame in the other sequence to be displayed at the same time are all analog frames of higher quality. Such intra-sequence and/or inter-sequence correlations can be utilized to enhance the quality of the digital frames. In one implementation, a simple temporal filter may be applied to each digital frame by using the intra-sequence correlations. FIG. 7 shows a schematic diagram of such an implementation.

As shown, for any decoded digital frame 720 (marked with "P") in a sequence 700, the previous analog frame 710 and subsequent analog frame 730 ( marked with "A") can be used for smoothing. In this example, two analog frames are used. In other implementations, it is possible to use more previous and/or subsequent analog frames. Specifically, the smoothed pixel value of the digital frame 720 may be expressed as follows:

$$P(u,v)=\text{median}\{A_{f-1}(u,v),P(u,v),A_{f+1}(u,v)\} \quad (18)$$

where $P(u,v)$, $A_{f-1}(u,v)$ and $A_{f+1}(u,v)$ represent the coordinates of the pixel in the digital frame 720, the previous analog frame 710 and the subsequent analog frame 730, respectively, and median$\{*\}$ represents a function that returns the median value.

Experiments have shown that the implementations of the subject matter described herein achieve better objective and subjective performance over conventional coding schemes. The low delay property and channel adaptation ability make implementations of the subject matter described herein applicable in real-time mobile 3D applications such as remote immersive experience and interactive control.

For example, in an example implementation, the digital encoding is done by using a variation of H.264. The encoding prediction structure is IPPP and the group of picture (GOP) size is set to 8. Bit-interleaved coded modulation (BICM) for digital transmission is implemented. Rate 1/2 convolutional code for FEC and QPSK modulation is used. In the analog codec, the number of chunks per frame is 256 (16×16). The channel is divided into 64 subcarriers of which 48 are used for data transmission. In this implementation, each Physical Layer Convergence Protocol (PLCP) frame contains 40 OFDM symbols, which translate to 1920 complex symbols.

Figure 8A:
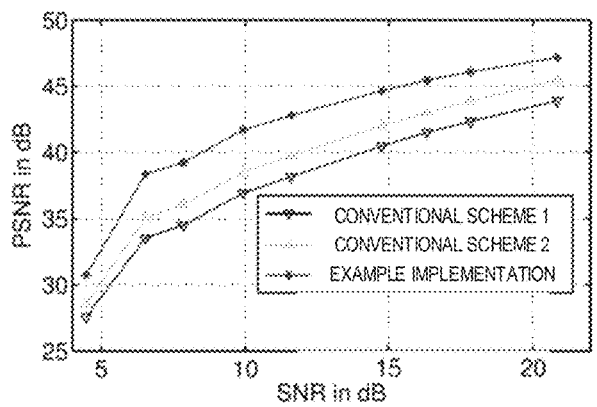
FIGS. 8A-8C are graphs showing performance comparison between an example implementation of the subject matter described herein and two conventional solutions for stereo video coding under different bandwidth settings.
Figure 8B:
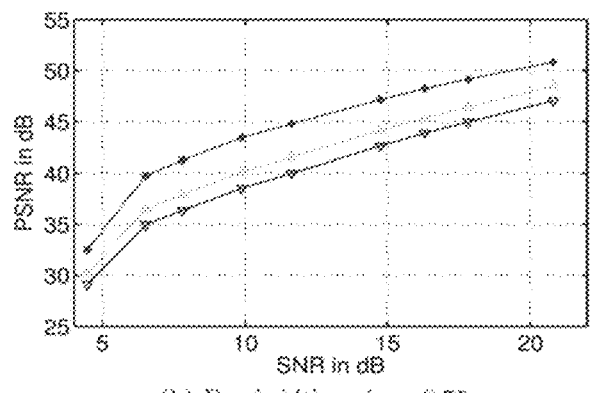
Figure 8C:
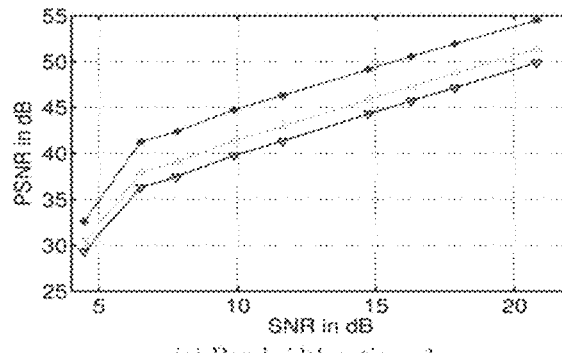

FIGS. 8A-8C show results of comparison between this example implementation and two conventional solutions for stereo video coding under different bandwidth settings. The two conventional coding schemes use inter-view SI and intra-view SI, respectively. It can be seen that the selective reference to the side information is a more efficient way to utilize the correlation. It provides about 1:5 dB gain in PSNR for each bandwidth setting. In addition, the zigzag coding structure provides even larger gains.

Figure 9A:
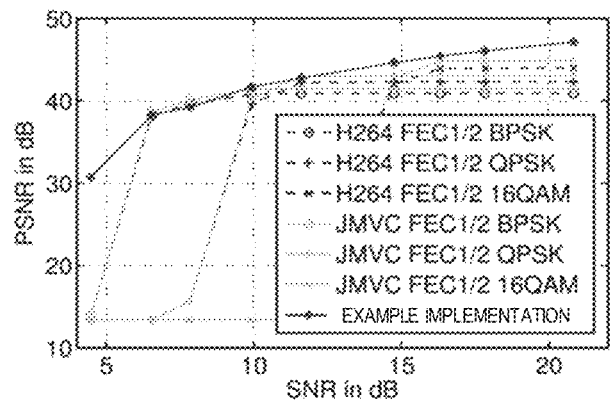
FIGS. 9A-9B are graphs showing performance comparison between an example implementation of the subject matter described herein and several digital coding schemes for different bandwidth ratios in an environment with stable channel condition.
Figure 9B:
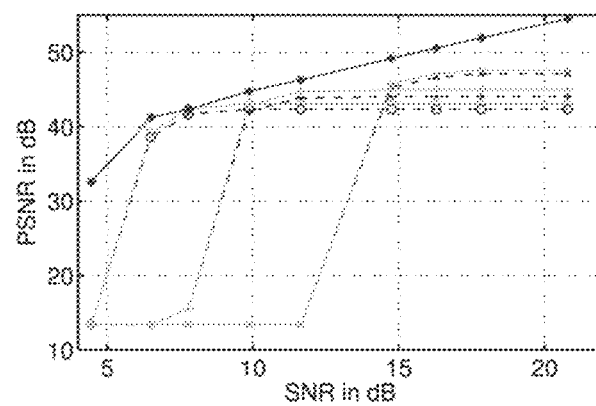

FIGS. 9A-9B show results of comparison of average dominant PSNR of the received stereo videos between the example implementation of the subject matter described herein and several digital coding schemes for different bandwidth ratios in an environment with stable channel condition. Conventional digital schemes show apparent cliff effects duo to the separate source-channel coding. If the transmitter over-estimates the channel condition and chooses a high order modulation, the receiver will experience decoding failure thus get nothing, therefore video quality drops sharply. As a result, the conventional digital transmission schemes are not adaptive to the wireless channel variation. On the contrary, the example implementation of the subject matter described herein achieves smooth quality scalability in the case of channel variation and can support a large dynamic SNR range and therefore can be readily embodied for stereo video multicast applications. Moreover, the PSNR curves in superior to the envelope of the digital schemes when the bandwidth ratio is 0.5 and 1.

For some applications, bandwidth may not be so critical but energy is quite limited. For example, in stereo aerial photography/filming by micro air vehicle and real time controlling system, power is supplied by battery. In an experiment, the energy efficiency of the example implementation of the subject matter described herein is compared with a low delay H.264 digital transmission scheme. In the experiment, the average power per constellation symbol is decreased to 75% and 50%, respectively, and then the dominant PSNR of the test stereo video sequences is evaluated. The outcome shows that by using the example implementation for stereo video transmission, half power budget can achieve comparable performance as omniscience digital low delay scheme.

Figure 10A:
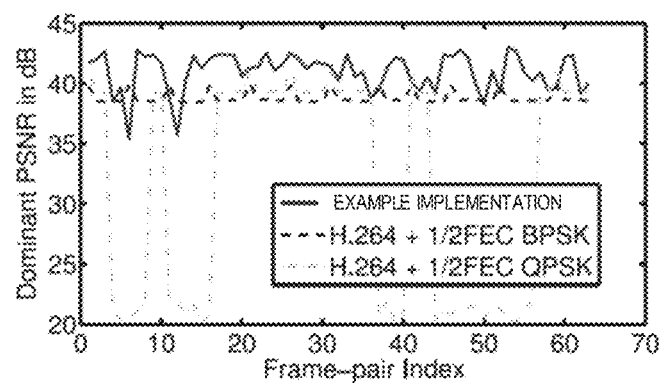
FIGS. 10A-10B are graphs showing performance comparison between an example implementation of the subject matter described herein and two conventional coding schemes in an environment with dynamic channel condition.
Figure 10B:
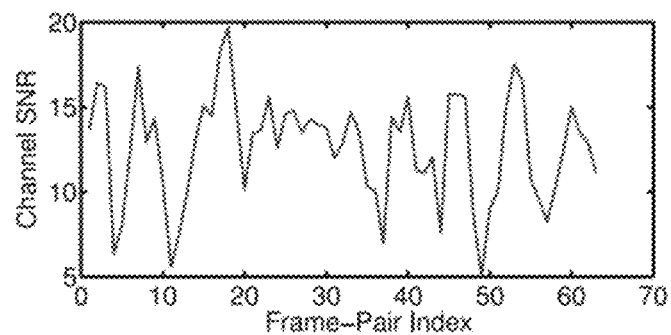

The example implementation also has good quality scalability over dynamic wireless channel. FIGS. 10A-10B shows results of comparison of the dominant PSNR and channel SNR between the example implementation of the subject matter described herein and two conventional coding schemes in an environment with dynamic channel condition. It can be seen that the example implantation outperforms H.264+½ BPSK scheme almost all the time and on average the gain is 2.17 dB. The H.264+½ BPSK scheme achieves some relatively constant dominant PSNR and cannot adapt to the channel variation, so it wastes the channel capacity when the channel condition is better than what the ½ BPSK requires. It can be also observed that although ½ QPSK coding and modulation can achieve higher dominant PSNR than ½ BPSK when the channel condition is good, it will degrade sharply if the channel condition gets worse, in which case the digital bits cannot be correctly received such that the receiver fails at decoding the following frames in the GOP of the stereo video. In sum, the example implementation scales well over the dynamic wireless channel and provides superior dominant PSNR compared to the digital scheme.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (AS SPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some example implementations of the subject matter described herein are listed below.

In an aspect, a device is provided. The device comprises an encoder configured to encode a first set of frames of a video as digital frames, the frames of the video being included in a plurality of sequences that are associated with one another; and encode a second set of the frames as analog frames, an analog frame being encoded with reference to a first digital frame having temporal consistency to the analog frame in a different one of the sequences, and a second digital frame prior to the analog frame in a same one of the sequences.

In some implementations, the first digital frame and the analog frame are captured at same time, and the second digital frame is immediately prior to the analog frame.

In some implementations, the encoder is configured to encode an analog frame by: spatially de-correlating the analog frame by a transformation to obtain a set of transformation coefficients; selecting side information provided by the first and second digital frames based on the transformation coefficients; and encoding the analog frames using the selected side information.

In some implementations, the encoder is configured to select the side information by: dividing the transformation coefficients into a plurality of chunks; and for each of the chunks, determining a first difference between the chunk and a first chunk corresponding to the chunk in the first digital frame; determining a second difference between the chunk and a second chunk corresponding to the chunk in the second digital frame; and selecting side information for the chunk based on the first and second differences.

In some implementations, the encoder is configured to select the side information for the chunk by: determining a variance of the chunk; determining a first variance of the first difference; determining a second variance of the second difference; and selecting the side information for the chunk based on the variance of the chunk, the first variance, and the second variance.

In some implementations, the encoder is configured to encode the analog frame by encoding the chunks using the side information for the respective chunks.

In some implementations, the encoder is configured to encode the digital frames to a basic quality that is associated with a low peak signal-to-noise ratio (PSNR).

In some implementations, the device further comprises a transmitter configured to transmit the encoded digital and analog frames.

In some implementations, the transmitter is configured to protect the encoded digital frames by: adding a forward error protection (FEC) code to a digital bit stream representing the encoded digital frames; modulating the digital bit stream with Quadrature Phase Shift Keying (QPSK) modulation into QPSK symbols; and transmitting the QPSK symbols with doubled symbol energy.

In some implementations, the transmitter is configured to determine average constellation symbol power based on total transmission power and a total bandwidth; determine average channel noise power based on the determined average constellation symbol power and a target signal-to-noise ratio (SNR); determine average symbol power for transmitting the encoded digital frames based on the average channel noise power and a threshold SNR; and allocate the total transmission power based on the determined average symbol power.

In some implementations, the transmitter is configured to transmit metadata indicating side information provided by the digital frames that is used in encoding the analog frames.

In some implementations, the video is a stereo video, and the plurality of sequences include a first sequence corresponding to a right-eye view of a scene and a second sequence corresponding a left-eye view of the scene.

In another aspect, a device is provided. The device comprises: an receiver configured to receive signals representing an encoded video, the video including frames from a plurality of sequences that are associated with one another, the signals including a digital signal representing a first set of the frames being encoded as digital frames, an analog signal representing a second set of the frames being encoded as analog frames, an analog frame being encoded with reference to a first digital frame which has temporal consistency with the analog frame in a different one of the sequences, and a second digital frame prior to the analog frame in a same one of the sequences; and a decoder configured to: decode the digital frames from the digital signal; and decode the analog frames from the analog signal at least in part based on the decoded digital frames.

In some implementations, the receiver is configured to receive metadata indicating side information provided by the digital frames that is used in encoding the analog frames, and the decoder is configured to decode the analog frames from the analog signal based on the decoded digital frames and the metadata.

In some implementations, the decoder is configured to smooth the decoded digital frames based on the decoded analog frames, a decoded digital frame being smoothed using a decoded analog frame prior to the decoded digital frame and a decoded analog frame after the decoded digital frames.

In yet another aspect, a method is provided. The method comprises encoding a first set of frames of a video as digital frames, the frames of the video being included in a plurality of sequences that are associated with one another; and encoding a second set of the frames as analog frames, an analog frame being encoded with reference to a first digital frame that is temporally consistent with the analog frame in a different one of the sequences, and a second digital frame prior to the analog frame in a same one of the sequences.

In some implementations, the first digital frame and the analog frame are captured at same time, and the second digital frame is immediately prior to the analog frame.

In some implementations, encoding an analog frame comprises: spatially de-correlating the analog frame by a transformation to obtain a set of transformation coefficients; selecting side information provided by the first and second digital frames based on the transformation coefficients; and encoding the analog frames using the selected side information.

In some implementations, selecting the side information comprises: dividing the transformation coefficients into a plurality of chunks; and for each of the chunks, determining a first difference between the chunk and a first chunk corresponding to the chunk in the first digital frame; determining a second difference between the chunk and a second chunk corresponding to the chunk in the second digital frame; and selecting side information for the chunk based on the first and second differences.

In some implementations, selecting the side information for the chunk comprises: determining a variance of the chunk; determining a first variance of the first difference; determining a second variance of the second difference; and selecting the side information for the chunk based on the variance of the chunk, the first variance, and the second variance.

In some implementations, encoding the analog frame comprises encoding the chunks using the side information for the respective chunks.

In some implementations, encoding the digital frames comprises encoding the digital frames to a basic quality that is associated with a low peak signal-to-noise ratio (PSNR).

In some implementations, the method further comprises transmit the encoded digital and analog frames.

In some implementations, transmitting the encoded digital frames comprises protecting the encoded digital frames, including: adding a forward error protection (FEC) code to a digital bit stream representing the encoded digital frames; modulating the digital bit stream with Quadrature Phase Shift Keying (QPSK) modulation into QPSK symbols; and transmitting the QPSK symbols with doubled symbol energy.

In some implementations, further comprising: determining average constellation symbol power based on total transmission power and a total bandwidth; determining average channel noise power based on the determined average constellation symbol power and a target signal-to-noise ratio (SNR); determining average symbol power for transmitting the encoded digital frames based on the average channel noise power and a threshold SNR; allocating the total transmission power based on the determined average symbol power.

In some implementations, further comprising transmitting metadata indicating side information provided by the digital frames that is used in encoding the analog frames.

In some implementations, the video is a stereo video, and the plurality of sequences include a first sequence corresponding to a right-eye view of a scene and a second sequence corresponding a left-eye view of the scene.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device comprising:
an encoder configured to:
encode a first set of frames of a video as digital frames, the frames of the video being included in a plurality of sequences that are associated with one another; and
encode a second set of frames of the video as analog frames, an analog frame being encoded with reference to:
a first digital frame of the digital frames having temporal consistency with the analog frame in a different one of the sequences, and
a second digital frame of the digital frames prior to the analog frame in a same one of the sequences.

2. The device of claim 1, wherein the first digital frame and the analog frame are captured at same time, and wherein the second digital frame is immediately prior to the analog frame.

3. The device of claim 1, wherein the encoder is configured to encode the analog frame by:
spatially de-correlating the analog frame by a transformation to obtain a set of transformation coefficients;
selecting side information provided by the first and second digital frames based on the transformation coefficients; and
encoding the analog frames using the selected side information.

4. The device of claim 3, wherein the encoder is configured to select the side information by:
dividing the transformation coefficients into a plurality of chunks; and
for each of the chunks,
determining a first difference between the chunk and a first chunk corresponding to the chunk in the first digital frame;
determining a second difference between the chunk and a second chunk corresponding to the chunk in the second digital frame; and
selecting the side information for the chunk based on the first and second differences.

5. The device of claim 4, wherein the encoder is configured to select the side information for the chunk by:
determining a variance of the chunk;
determining a first variance of the first difference;
determining a second variance of the second difference; and
selecting the side information for the chunk based on the variance of the chunk, the first variance, and the second variance.

6. The device of claim 4, wherein the encoder is configured to encode the analog frame by encoding the chunks using the side information for the respective chunks.

7. The device of claim 1, wherein the encoder is configured to encode the digital frames to a basic quality that is associated with a low peak signal-to-noise ratio (PSNR).

8. The device of claim 1, further comprising:
a transmitter configured to transmit the encoded digital and analog frames.

9. The device of claim 8, wherein the transmitter is further configured to protect the encoded digital frames by:
adding a forward error correction (FEC) code to a digital bit stream representing the encoded digital frames;
modulating the digital bit stream with Quadrature Phase Shift Keying (QPSK) modulation into QPSK symbols; and
transmitting the QPSK symbols with doubled symbol energy.

10. The device of claim 8, wherein the transmitter is further configured to:
determine average constellation symbol power based on total transmission power and a total bandwidth;
determine average channel noise power based on the determined average constellation symbol power and a target signal-to-noise ratio (SNR);
determine average symbol power for transmitting the encoded digital frames based on the average channel noise power and a threshold SNR; and
allocate the total transmission power based on the determined average symbol power.

11. The device of claim 8, wherein the transmitter is further configured to transmit metadata indicating side information provided by the digital frames that is used in encoding the analog frames.

12. The device of claim 1, wherein the video is a stereo video, and wherein the plurality of sequences include a first sequence corresponding to a right-eye view of a scene and a second sequence corresponding a left-eye view of the scene.

13. A device comprising:
a receiver configured to receive signals representing an encoded video, the encoded video including frames from a plurality of sequences that are associated with one another, the signals including:
a digital signal representing a first set of the frames of the encoded video being encoded as digital frames,
an analog signal representing a second set of the frames of the encoded video being encoded as analog frames, an analog frame being encoded with reference to a first digital frame of the digital frames having temporal consistency with the analog frame in a different one of the sequences, and a second digital frame of the digital frames prior to the analog frame in a same one of the sequences; and
a decoder configured to:
decode the digital frames from the digital signal; and
decode the analog frames from the analog signal at least in part based on the decoded digital frames.

14. The device of claim 13, wherein the receiver is further configured to receive metadata indicating side information provided by the digital frames that is used in encoding the analog frames,
and wherein the decoder is configured to decode the analog frames from the analog signal based on the decoded digital frames and the metadata.

15. The device of claim 13, wherein the decoder is further configured to smooth the decoded digital frames based on the decoded analog frames, a decoded digital frame being smoothed using a decoded analog frame prior to the decoded digital frame and a decoded analog frame after the decoded digital frames.

* * * * *